Aug. 22, 1933.     J. T. FRIEDLI ET AL     1,923,304
HEADLIGHT TESTING DEVICE
Filed Jan. 29, 1932     2 Sheets-Sheet 1

John T. Friedli
John D. Guiss
Harry C. Schroeder
INVENTORS.
BY
ATTORNEYS.

Aug. 22, 1933.   J. T. FRIEDLI ET AL   1,923,304
HEADLIGHT TESTING DEVICE
Filed Jan. 29, 1932   2 Sheets-Sheet 2
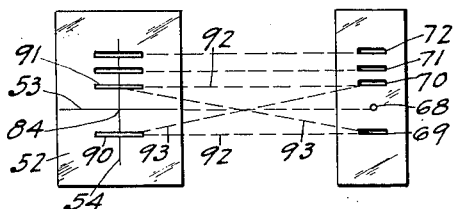
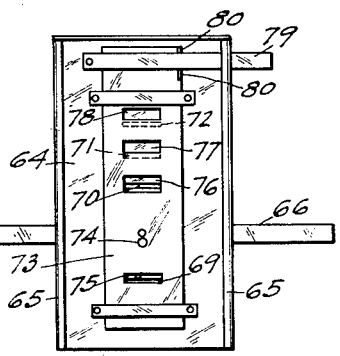
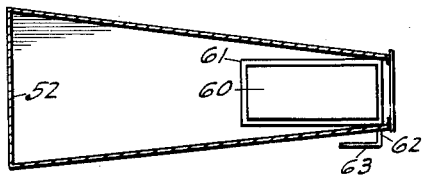
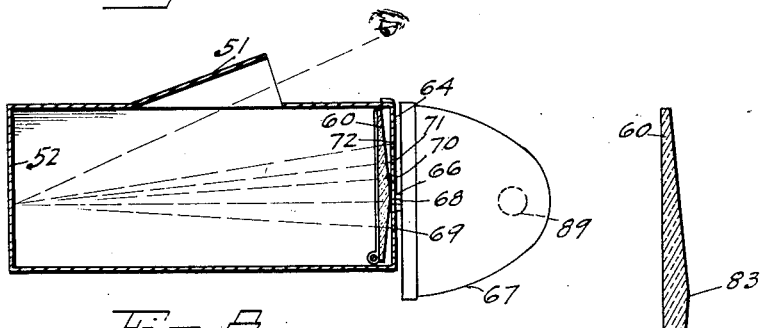
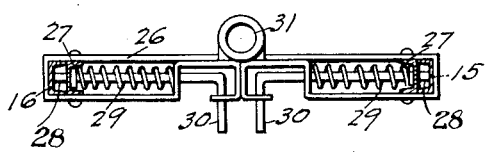
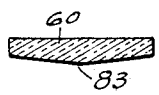

Patented Aug. 22, 1933

1,923,304

UNITED STATES PATENT OFFICE 1,923,304

HEADLIGHT TESTING DEVICE

John T. Friedli, Seattle, Wash., and John D. Guiss, San Francisco, Calif.

Application January 29, 1932. Serial No. 589,618

12 Claims. (Cl. 88—14)

This invention is a headlight testing device especially directed to the purpose of testing and focusing the headlights of automotive vehicles.

The main object of the invention is to provide a headlight testing device with means whereby the correct focus of the headlights may be obtained and with which any inaccuracy in focus or alignment may be readily detected.

Another object of the invention is to provide a headlight testing device with which the focus of the headlights may be determined as also the tilt or direction of the beam as related to the vertical and longitudinal horizontal axis of the vehicle.

A further object of the invention is to provide a device as outlined which will properly analyze all upper and lower rays directed from the headlamp, providing a positive check on all rays which are liable to cause glare.

A still further object of the invention is to provide a device as outlined with means for analyzing rays from various points of the headlamp independently of the rest of the lamp and to provide a lens which will direct all rays, when desired, to a common point when the lamp is in focus.

Other objects and advantages of the invention will become apparent as the following description is read on the drawings forming a part of this specification and in which similar reference characters are used to indicate similar parts throughout the several views, and in which:

Fig. 5 is a section taken on line 5—5 of Fig. 2.

Fig. 6 is a rear elevation of the diaphragm plate.

Fig. 7 is a transverse section taken through the dark chamber.

Fig. 8 is a vertical section taken through the dark chamber and showing the projection of rays with the lens.

Fig. 9 is a diagrammatic view showing the light ray passages and projection of the rays when no lens is used.

Fig. 10 is a vertical section through the lens.

Fig. 11 is a transverse section through the lens.

Figure 1:
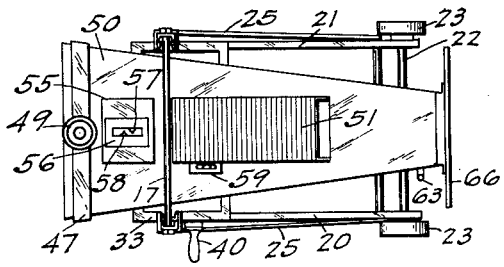
Fig. 1 is a top plan view of the invention.
Figure 4:
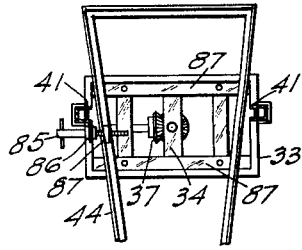
Fig. 4 is a section taken on line 4—4 of Fig. 2.
Figure 2:
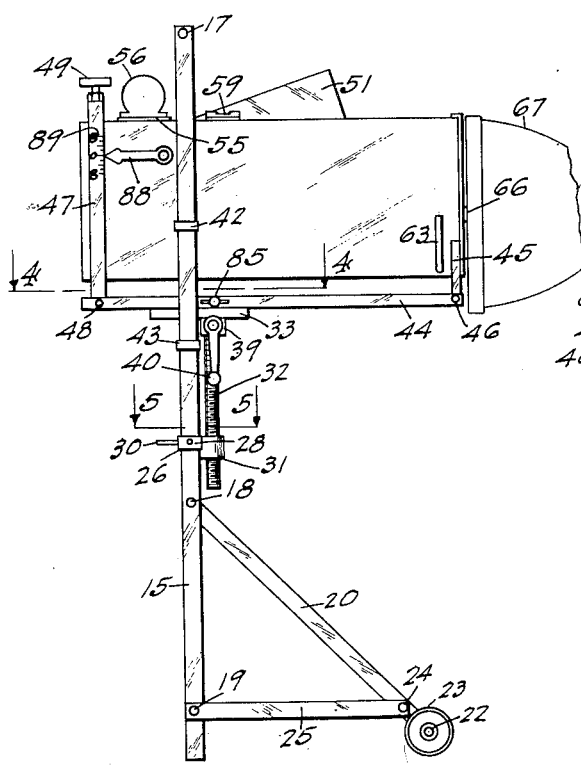
Fig. 2 is a side elevation of the invention as applied to a headlamp.
Figure 3:
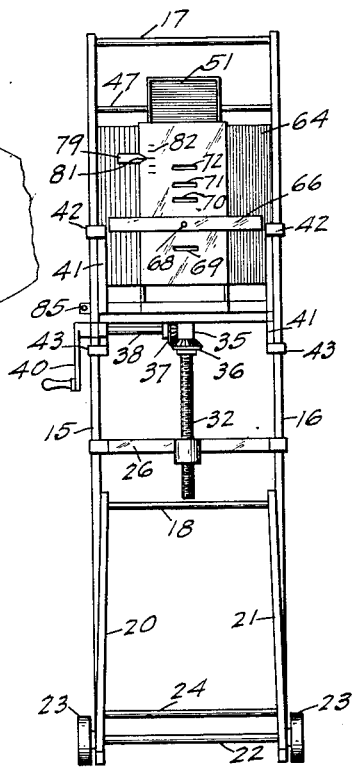
Fig. 3 is a front elevation of the headlight testing device.

The carrier for the device may be of any suitable form and construction and is indicated in the drawings as consisting of a frame formed of small channels and consisting of two standards 15 and 16 spacedly secured together by spacer bars 17, 18 and 19.

Projecting forwardly from the standards are two strut members 20 and 21 which are secured at one end to the standards by the spacer 18, and have pivotally mounted at the other end, on an axle 22, the wheels 23 on which the device may be readily moved about. A spacer bar 24 secures the struts 20 and 21 in spaced relation, and a tie bar 25 is provided for each of the struts, and is secured at its opposite ends by means of the spacer bars 19 and 24.

Slidably mounted and removably secured on the standards 15 and 16 is a beam 26 which consists of a bar formed at each end about the standards 15 and 16, and provided with spacers 27 which also act as guides for the plungers 28 which are urged into apertures formed in the standards by springs 29, the plungers being retractable by means of handles 30. Integral with the beam 26 is a nut 31 which cooperates with the elevating screw 32.

The elevating device consists of a rectangular frame 33 slidably mounted between the standards 15 and 16 and having a transverse member 34 which is provided with an integral bearing 35 in which the end of screw 32 is pivoted. Fixedly secured on the screw 32 is a mitre gear 37 which is secured on a shaft 38. Shaft 38 is rotatably mounted at one end in the bearing 35 and adjacent the other end in a bearing 39 secured on the frame 33. A crank 40 is secured on the end of shaft 38 for operation thereof. The frame 33 has integral members 41 which extend along the standards 15 and 16 and terminate in encompassing members 42 and 43 at their opposite ends and which are slidably on the standards 15 and 16.

The dark chamber frame is secured to the elevating frame 33 and consists of a substantially trapezoidal frame 44 havings legs 45 pivotally connected at 46 and an inverted U member 47 pivotally connected at the ends of the legs thereof at the wide end of the frame as indicated at 48. An adjusting screw 49 cooperates between the U member 47 and the dark chamber.

The lark chamber consists of a trapezoidal box like structure 50 which has secured to the narrow end, the legs 45 and which is adjustably supported at the rear or wide end by the screw 49, which cooperates with a nut secured to the dark chamber. A hood 51 forms a sight aperture through which the screen 52 may be observed. This screen is provided with cross lines 53 and 54. A pad 55 is provided on top of the dark chamber and is formed parallel to the longitudinal and transverse axis of the dark chamber and is adapted to receive thereon an angle indicator 56 which is provided with an adjustable pointer 57 and a pendulum actuated pointer 58. A level 59 is also provided for indicating the true level of the horizontal axis of the dark chamber.

Pivotally mounted adjacent the forward end of the dark chamber is a lens 60 which is mounted in a frame 61, the lower end of which is secured to a shaft 62 which extends through the side of the housing or dark chamber and is provided with an operating handle 63.

Removably mounted at the front end of the dark chamber is a diaphragm 64 which has flanges 65 formed at both sides. A spacing and aligning bar 66 is adapted to cooperate with the headlamp 67 of an automotive vehicle.

Formed through the bar 66 and diaphragm 64 is a pin hole 68 which is disposed in registry with the intersection of the cross lines 53 and 54. A slit 69 is formed a predetermined distance below the pin hole 68 and three slits 70, 71 and 72 are formed predetermined distances above the pin hole 68. Slidably mounted at the rear of the diaphragm 64 is a plate 73 which has an aperture 74 and a plurality of rectangular slots 75, 76, 77 and 78 formed therein adapted to selectively register with the various slits 69 to 72 and pin hole 74 or register with all slots coincidently. A pivoted lever 79 cooperates with tongues 80 formed on the plate 73 and is provided with a pointer 81 extending over the front of the diaphragm. Index marks 82 are provided to indicate settings of the plate 73.

The lens consists of a rectangular section of crown glass 60 which is ground to conical form and mounted with the apex 83 in registry with the pin hole 68 and is so ground as to bring the rays to a common focus at the intersection 84 of the cross lines 53 and 54, these rays being normally brought to coincidence at a distance of twenty-five feet.

The transverse adjustment of the dark chamber is obtained by means of a screw 85 which is rotatably mounted in a bearing 86 on the frame 33 and cooperates with a nut fixed to the frame 44, the plates 87 to which frame 44 is secured being slidably secured to the frame 33, permitting the frame 44 to be moved transversely on the supporting frame 33.

A tilt indicator is provided and consists of a pointer 88 pivotally mounted on the dark chamber and frictionally retained in relative position. Index marks 89 numbered and graduated in inches drop in twenty-five feet are provided on the U member 47.

The invention is used as follows: The device is moved up to the headlight to be tested and brought into registry by means of the elevating screw 32 operated by handle 40 and transverse adjustment screw 85, the bar 66 being brought against the rim of the headlight.

At this stage, the pin hole 68 is in horizontal registry between the bulb 89 and intersection 84 of the cross lines.

The lens 60 is dropped to the position shown in Fig. 7 and the slide 73 is adjusted by means of lever 79 to open pin hole 68, an image of the filament being projected on the screen 52.

The slide 73 is then adjusted to open slits 69 and 70 and rays therefrom will be projected onto lines 90 and 91, although it will not be known whether the rays are slightly converging as at 92 or crossed as at 93. This can readily be ascertained by closing one of the slits 69 or 70 by adjustment of the slide. After proper adjustment of the headlight, which is indicated by rays 92 falling squarely on the lines 90 and 91 which are formed in converging relation to the slits 69 and 70 this convergence being equal to one twenty fifth inch per foot of dark chamber length for each inch displacement of the slit from the pin hole.

The lens 60 is then turned to the position shown in Fig. 8 and all rays, through all the slits will then be directed to the common focal point at the intersection 84.

The pointer 88 is then adjusted to zero and the proper tilt obtained by adjusting the dark chamber by means of the screw 49, after which the headlight is adjusted to again bring the rays to converging focus on the intersection 84.

It will be noted that variations in construction and arrangement of parts which are consistent with the appended claims may be resorted to without detracting from the spirit or scope of the invention or sacrificing any of the advantages thereof.

We claim:

1. A headlight testing device in combination, a dark chamber and adjustable supporting means therefore, a diaphragm removably mounted at the front end of said chamber and provided with a central pin hole and a plurality of spaced horizontal slots, a screen formed parallel to the diaphragm at the rear interiorly of said dark chamber and provided with cross lines, observing means for the screen, plural adjusting means for adjusting said dark chamber in true alignment with a vehicle, and tilt indicating means whereby the tilt of a vehicle headlight may be adjusted.

2. A headlight testing device in combination, a dark chamber and adjustable supporting means therefore, a diaphragm removably mounted at the forward end of said dark chamber and provided with a central pin hole and a plurality of spaced horizontal slots, means for selectively covering said slots and pin hole, cross lines formed on the inside of the rear wall of said dark chamber and observing means therefor, a lens provided with one flat face and one conical face and hingedly mounted adjacent said diaphragm, means for adjusting said dark chamber in true alignment with a vehicle and, tilt indicating means to which the tilt of the headlight may be adjusted.

3. A headlight testing device, in combination, a dark chamber provided with a sight aperture adjacent the forward end thereof, a screen formed on the interior surface of the rear wall thereof, a diaphragm removably mounted on the front thereof and provided with a central pin hole and a plurality of slits above and below said pin hole, a lens hingedly mounted adjacent the forward end of said dark chamber means for selectively covering said pin hole and said slits, supporting means for said chamber, a surface on said chamber parallel to the focal axis of said dark chamber and, adjusting means for adjusting said dark chamber in alignment with the horizontal and vertical axes of a vehicle.

4. In combination with a headlight testing device having a dark chamber; an angle indicator, a surface on said dark chamber formed parallel to the true horizontal axis of said dark chamber adapted to receive said angle indicator, means for adjusting said dark chamber in angular agreement with said indicator, said angle indicator having a pendulum pointer and an adjustable pointer adapted to be adjusted in registry with the pendulum pointer said adjustable pointer being adjusted to the relative inclination of a vehicle.

5. A headlight testing device, in combination, a dark chamber and adjustable supporting means therefore, a diaphragm provided with a pin hole and a plurality of horizontal slits above and below said pin hole, a screen formed on the rear wall interiorly of said dark chamber parallel to said diaphragm, a hooded sight aperture in the top adjacent the forward end of said chamber, an aligning indicator seat on said chamber formed parallel to the axis thereof, adjustable means for selectively closing said pin hole and said slits, and a conoidal lens removably mounted in said dark chamber adjacent to said diaphragm and in axial registry with the pin hole.

6. A headlight testing device, in combination, a dark chamber and supporting means therefore, a diaphragm at the forward end thereof provided with a pin hole and equally spaced slits above and below said pin hole, means for selectively covering said pin hole and slits, a screen parallel to said diaphragm and having cross lines formed thereon and located at the rear of said dark chamber and interiorly thereof, means for angularly, vertically and transversely adjusting said dark chamber, and a conoidal lens removably mounted adjacent to said diaphragm and in axial registry with the pin hole.

7. In combination with a headlight testing device having a dark chamber provided with a screen and observing means therefor; a diaphragm provided with a central pin hole and a plurality of spaced horizontal slits above and below said pin hole and spaced from the screen, adjustable means for selectively closing said pin hole and slits, and indicating means for said adjustable means.

8. In combination with a headlight testing device having a dark chamber, a screen at the rear end thereof, and observing means therefor; a removable diaphragm provided with a pin hole and a plurality of spaced horizontal slits above and below said pin hole said diaphragm being located at the forward end of said dark chamber and means for selectively covering said pin hole and slits.

9. In combination with a headlight testing device having a dark chamber, a screen at the rear end thereof and observing means therefor; a diaphragm provided with a pin hole and a plurality of spaced slits above and below said pin hole and located at the forward end of the dark chamber, and, a lens removably mounted in cooperative relation to said diaphragm within the chamber, said lens being of conoidal form and mounted in axial registry with the pin hole.

10. In combination with a headlight testing device having a dark chamber, a screen at one end thereof; and a diaphragm at the other end provided with parallel slits; a lens of conoidal form hingedly mounted in said dark chamber adjacent said diaphragm.

11. In combination with a headlight testing device having a dark chamber, a screen formed at the rear thereof and observing means therefor, and a diaphragm provided with a pinhole and a plurality of parallel slits and located at the front of the dark chamber; said pin hole and slits being adapted for directing headlight rays through said openings in normal converging relation, means for determining crossing rays and a lens mounted adjacent to the diaphragm for converging said rays to a common focal point on said screen and means for moving said lens out of cooperative relation to the diaphragm.

12. A headlight testing device having a dark chamber provided with a screen having cross lines at the rear thereof and observing means therefor and a diaphragm provided with light passages at the front thereof; said passages being adapted for admitting normal light rays through said passages in normal relation, means for determining misdirected or crossed rays, and a lens for converging said normal rays to a common focal point on said screen when the headlight is properly focused and adjusted said lens being hingedly mounted to permit removal of the lens from the area of light rays.

JOHN T. FRIEDLI.
JOHN D. GUISS.